(12) United States Patent
Badruzzaman

(10) Patent No.: US 11,897,791 B2
(45) Date of Patent: Feb. 13, 2024

(54) PROCESSING COOLING TOWER BLOWDOWN TO PRODUCE FERTILIZER

(71) Applicant: Saudi Arabian Oil Company, Dhahran (SA)

(72) Inventor: Mohammad Badruzzaman, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 63 days.

(21) Appl. No.: 17/675,794

(22) Filed: Feb. 18, 2022

(65) Prior Publication Data

US 2023/0264984 A1 Aug. 24, 2023

(51) Int. Cl.
| | | |
|---|---|---|
| *C02F 1/42* | (2023.01) | |
| *C02F 9/00* | (2023.01) | |
| *C02F 101/10* | (2006.01) | |
| *C02F 103/02* | (2006.01) | |

(52) U.S. Cl.
CPC .............. *C02F 1/42* (2013.01); *C02F 9/00* (2013.01); *C02F 2101/105* (2013.01); *C02F 2103/023* (2013.01); *C02F 2303/16* (2013.01); *C02F 2303/22* (2013.01)

(58) Field of Classification Search
None
See application file for complete search history.

(56) References Cited

U.S. PATENT DOCUMENTS

| | | | | |
|---|---|---|---|---|
| 3,595,785 A | * | 7/1971 | Bruce | C02F 1/5236 |
| | | | | 501/59 |
| 3,639,278 A | * | 2/1972 | Hwa | C02F 5/08 |
| | | | | 210/698 |
| 4,477,355 A | * | 10/1984 | Liberti | B01J 49/08 |
| | | | | 210/906 |
| 6,336,058 B1 | * | 1/2002 | Fowee | C02F 5/025 |
| | | | | 210/698 |
| 6,655,322 B1 | * | 12/2003 | Godwin | F22B 37/565 |
| | | | | 122/382 |
| 7,268,251 B2 | * | 9/2007 | Geisendoerfer | C07D 211/94 |
| | | | | 560/205 |
| 7,588,744 B1 | * | 9/2009 | Sylvester | B82Y 30/00 |
| | | | | 71/33 |
| 10,464,852 B2 | | 11/2019 | Blaney et al. | |
| 2007/0237885 A1 | * | 10/2007 | Jayaprakasha | A23L 33/105 |
| | | | | 426/655 |
| 2009/0211983 A1 | * | 8/2009 | Keister | C02F 1/42 |
| | | | | 210/687 |

* cited by examiner

*Primary Examiner* — Chester T Barry
(74) *Attorney, Agent, or Firm* — Fish & Richardson P.C.

(57) ABSTRACT

A blowdown water stream from a cooling tower is contacted with an ion exchange resin packing, such that at least a portion of the phosphorus from the blowdown water stream adsorbs to the ion exchange resin packing to produce a water stream that has a phosphorus content that is less than a phosphorus content of the blowdown water stream. A regenerant stream is contacted with the ion exchange resin packing, such that at least a portion of the phosphorus that has adsorbed to the ion exchange resin packing, desorbs from the ion exchange resin packing to produce a spent regenerant stream. The spent regenerant stream, a first reactant stream including magnesium ions, and a second reactant stream including ammonium ions are flowed to a reaction vessel. The spent regenerant stream, the first reactant stream, and the second reactant stream are mixed to produce a product that includes struvite.

14 Claims, 2 Drawing Sheets

US 11,897,791 B2

PROCESSING COOLING TOWER BLOWDOWN TO PRODUCE FERTILIZER

TECHNICAL FIELD

This disclosure relates to water processing, and in particular, cooling tower blowdown water processing.

BACKGROUND

Recirculating evaporative cooling towers are commonly used in power plants, refineries, oil and gas operations, and community air conditioning plants around the world. In some cases, cooling towers can consume about 20 to 30% of a facility's total water use. A portion of the water used in a cooling tower is lost as blowdown water. Blowdown water is the water that remains and circulates in a cooling tower, after some water naturally evaporates from the cooling tower under typical operating conditions. As such, the blowdown water can accumulate dissolved solids. Blowdown water is typically taken out of the cooling tower water circulation loop and replaced with fresh make-up water.

SUMMARY

This disclosure describes technologies relating to water processing, and in particular, cooling tower blowdown water processing to produce a phosphorus-based fertilizer. Certain aspects of the subject matter described can be implemented as a system. The system includes a blowdown water storage tank, an ion exchange vessel, a regenerant storage tank, a spent regenerate storage tank, and a reaction vessel. The blowdown water storage tank is in fluid communication with a cooling tower. The blowdown water storage tank is configured to receive blowdown water from the cooling tower. The blowdown water includes phosphorus. The ion exchange vessel is in fluid communication with the blowdown water storage tank. The ion exchange vessel is configured to receive the blowdown water from the blowdown water storage tank. The ion exchange vessel includes an ion exchange resin packing. The ion exchange resin packing is configured to adsorb at least a portion of the phosphorus from the blowdown water as the blowdown water comes into contact with the ion exchange resin packing to produce a water stream having a phosphorus content that is less than a phosphorus content of the blowdown water. The regenerant storage tank is in fluid communication with the ion exchange vessel. The regenerant storage tank stores a regenerant. The regenerant includes sodium chloride. The ion exchange vessel is configured to receive the regenerant from the regenerant storage tank. The regenerant is configured to desorb at least a portion of the phosphorus that has adsorbed to the ion exchange resin packing, from the ion exchange resin packing as the regenerant comes into contact with the ion exchange resin packing to produce a spent regenerant stream. The spent regenerant storage tank is in fluid communication with the ion exchange vessel. The spent regenerant storage tank is configured to receive the spent regenerant stream from the ion exchange vessel. The reaction vessel is in fluid communication with the spent regenerant storage tank. The reaction vessel is configured to receive the spent regenerant stream from the spent regenerant storage tank, a first reactant stream, and a second reactant stream. The first reactant stream includes magnesium ions. The second reactant stream includes ammonium ions. The reaction vessel is configured to mix the spent regenerant stream, the first reactant stream, and the second reactant stream to produce a product that includes struvite.

This, and other aspects, can include one or more of the following features. The reaction vessel can include a mixer. The mixer can be configured to mix the spent regenerant stream, the first reactant stream, and the second reactant stream to promote interaction amongst the spent regenerant stream, the first reactant stream, and the second reactant stream, resulting in producing the product. The system can include a first backwash storage tank that is in fluid communication with the ion exchange vessel. The first backwash storage tank can be configured to receive at least a portion of the water stream from the ion exchange vessel. The portion of the water stream can be circulated back to the ion exchange vessel to remove at least a portion of solids from the ion exchange resin packing to produce a backwash stream. The system can include a second backwash storage tank that is in fluid communication with the ion exchange vessel. The second backwash storage tank can be configured to receive the backwash stream from the ion exchange vessel and store the backwash stream for subsequent processing or disposal. The system can include a filter that is in fluid communication with the reaction vessel. The filter can be configured to receive a remaining supernatant fluid, apart from the product, from the reaction vessel. The filter can be configured to filter the remaining supernatant fluid to remove at least a portion of solids to produce a filtered supernatant stream. The blowdown storage tank can be configured to receive the filtered supernatant stream, such that the filtered supernatant stream can be recycled back to the ion exchange vessel for further phosphorus removal. The system can include a dryer downstream of the reaction vessel. The dryer can be configured to receive the product from the reaction vessel. The dryer can be configured to dry the product to produce a dried struvite product. The dried struvite product can have a moisture content that is non-zero and less than 25 weight percent (wt. %). The regenerant can have a sodium chloride content in a range of from about 6 weight to volume percent (wt/v %) to about 15 wt/v %). A molar ratio of the magnesium ions in the first reactant stream to the ammonium ions in the second reactant stream can be about 1:1.

Certain aspects of the subject matter described can be implemented as a method. A blowdown water stream is flowed from a cooling tower to a blowdown water storage tank. The blowdown water includes phosphorus. The blowdown water stream is flowed from the blowdown water storage tank to an ion exchange vessel. The ion exchange vessel includes an ion exchange resin packing. The blowdown water stream is contacted with the ion exchange resin packing, such that at least a portion of the phosphorus from the blowdown water stream adsorbs to the ion exchange resin packing to produce a water stream that has a phosphorus content that is less than a phosphorus content of the blowdown water stream. A regenerant stream is flowed from a regenerant storage tank to the ion exchange vessel. The regenerant stream includes sodium chloride. The regenerant stream is contacted with the ion exchange resin packing, such that at least a portion of the phosphorus that has adsorbed to the ion exchange resin packing, desorbs from the ion exchange resin packing to produce a spent regenerant stream. The spent regenerant stream is flowed from the ion exchange vessel to a reaction vessel. A first reactant stream is flowed to the reaction vessel. The first reactant stream includes magnesium ions. A second reactant stream is flowed to the reaction vessel. The second reactant stream includes ammonium ions. The spent regenerant stream, the first reactant stream, and the second reactant stream are mixed in the reaction vessel to produce a product that includes struvite.

This, and other aspects, can include one or more of the following features. The blowdown water stream can include chloride. Prior to contacting the blowdown water stream with the ion exchange resin packing, a chloride quenching solution can be added to the blowdown water stream, such that at least a portion of the chloride in the blowdown water stream is removed. At least a portion of the water stream can be flowed from the ion exchange vessel to a first backwash storage tank. At least the portion of the water stream can be circulated back from the first backwash storage tank to the ion exchange vessel to remove at least a portion of solids from the ion exchange resin packing to produce a backwash stream. The backwash stream can be flowed from the ion exchange vessel to a second backwash storage tank. The backwash stream can be stored in the second backwash storage tank for subsequent processing or disposal. A remaining supernatant fluid, apart from the product, can be flowed from the reaction vessel to a filter. At least a portion of solids can be removed from the remaining supernatant fluid by the filter to produce a filtered supernatant stream. The filtered supernatant stream can be flowed from the filter to the blowdown storage tank. The filtered supernatant stream can be recycled to the ion exchange vessel for further phosphorus removal. The product can be flowed from the reaction vessel to a dryer. The product can be dried by the dryer to produce a dried struvite product. The dried struvite product can have a moisture content that is non-zero and less than 25 wt. %. The regenerant stream can have a sodium chloride content in a range of from about 6 wt/v % to about 15 wt/v %. A molar ratio of the magnesium ions in the first reactant stream to the ammonium ions in the second reactant stream can be about 1:1.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
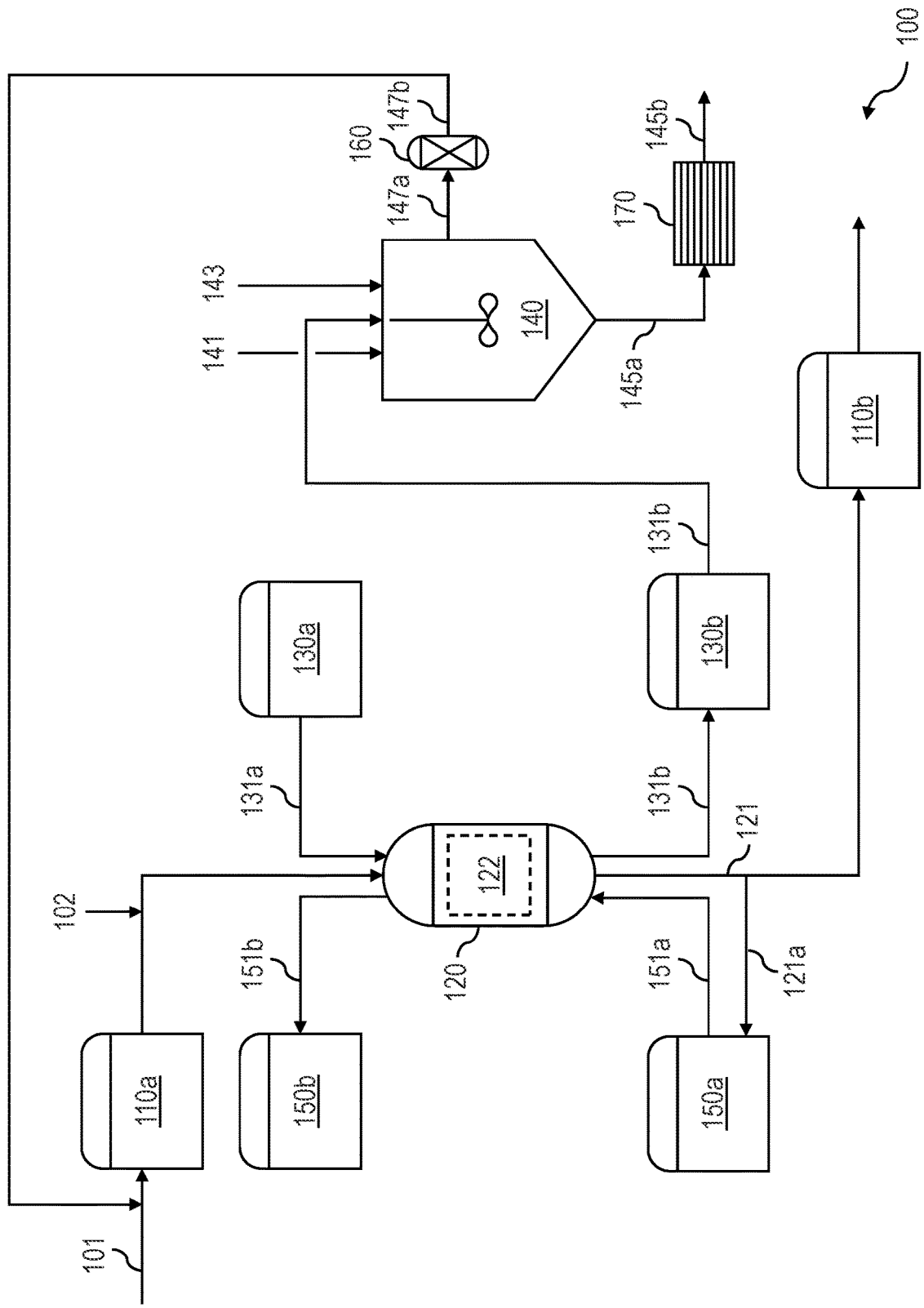
FIG. 1 is a schematic diagram of an example system for processing cooling tower blowdown water to produce fertilizer.

This disclosure describes water processing, and in particular, cooling tower blowdown water processing to produce a phosphorus-based fertilizer. Cooling tower blowdown water is typically replaced with fresh make-up water. In some cases, fresh make-up water is treated sewage effluent (TSE). However, TSE often includes phosphorus, which can accumulate in the cooling tower circulation. In fact, it can be common to observe in TSE, phosphorus concentrations in a range of from about 4 milligrams of phosphorus per liter (mg P/L) to about 14 mg P/L. Further, in some cases, phosphorus is added as a corrosion inhibitor. The system described herein includes an ion exchange vessel that uses an ion exchange resin packing to capture phosphorus from the cooling tower blowdown water. The captured phosphorus is then combined with magnesium and ammonia in a reaction vessel to form struvite, which can subsequently be used as a fertilizer. The ion exchange resin packing can be regenerated to repeat the phosphorus capture from the cooling tower blowdown water.

The subject matter described in this disclosure can be implemented in particular implementations, so as to realize one or more of the following advantages. Cooling tower blowdown water, which is usually a waste stream, can be processed to produce a phosphorus-based fertilizer. The processed water with reduced phosphorus content can be recycled as make-up water to the cooling tower. The remaining fluid in the reaction vessel (apart from the struvite) can be filtered and recycled to recover additional phosphorus to produce more fertilizer. The disposal of phosphorus-laden water can be considered a major environmental concern, as the phosphorus discharge upper limit is stringent (for example, less than 1 milligram per liter) in many areas of the world. The processes and systems described can mitigate or eliminate disposal of phosphorus to the environment (for example, surface water bodies), thereby preventing environmental issues (such as eutrophication) in the receiving bodies of water of such disposal water streams. The processes and systems described can enhance the circular economy of water systems by converting a waste stream (for example, tower blowdown water) into a recovered resource (struvite fertilizer).

In each of the configurations described later, process streams (also referred to as "streams") are flowed within the described system. The process streams can be flowed using one or more flow control systems implemented throughout the system. A flow control system can include one or more flow pumps to pump the process streams, one or more flow pipes through which the process streams are flowed, and one or more valves to regulate the flow of streams through the pipes.

In some implementations, a flow control system can be operated manually. For example, an operator can set a flow rate for each pump by changing the position of a valve (open, partially open, or closed) to regulate the flow of the process streams through the pipes in the flow control system. Once the operator has set the flow rates and the valve positions for all flow control systems distributed across the system, the flow control system can flow the streams within a unit or between units under constant flow conditions, for example, constant volumetric rate or other flow conditions. The change the flow conditions, the operator can manually operate the flow control system, for example, by changing the valve position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). For example, an operator can set the flow rates by setting the valve positions for all flow control systems distributed across the system using the computer system. In such implementations, the operator can manually change the flow conditions by providing inputs through the computer system. In such implementations, the computer system can automatically (that is, without manual intervention) control one or more of the flow control systems, for example, using feedback systems implemented in one or more units and connected to the computer system. For example, a sensor (such as a pressure sensor, temperature sensor, or other sensor) can be connected to a pipe through which a process stream flows. The sensor can monitor and provide a flow conditions (such as a pressure, temperature, or other flow condition) of the process stream to the computer system. In response to the flow condition deviating from a set point (such as a target pressure value, a target temperature value, or other target value) or exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to open a valve to relieve pressure or a signal to shut down process stream flow.

FIG. 1 shows an example system 100 which can be used to process cooling tower blowdown water to produce a phosphorus-based fertilizer. The system 100 includes a blowdown water storage tank 110a, an ion exchange vessel 120, a regenerant storage tank 130a, a spent regenerant storage tank 130b, and a reaction vessel 140. The blowdown water storage tank 110a is in fluid communication with a cooling tower and receives blowdown water 101 from the cooling tower. The blowdown water 101 is the water that remains and circulates in a cooling tower, as some water evaporates from the cooling tower. As such, the blowdown water 101 includes (and accumulates) dissolved solids (such as calcium, magnesium, chloride, and silica). In some cases, the blowdown water 101 includes phosphorus. The blowdown water 101 can include reactive, dissolved phosphorus species, for example, in the form of hydrogen phosphate ions (such as $H_2PO_4^-$ or $HPO_4^{2-}$), depending on the potential of hydrogen (pH) of the blowdown water 101. Fresh make-up water is typically added, while a slip stream of the blowdown water 101 is flowed out of the circulation loop for the cooling tower. This slip stream is the blowdown water 101 flowing to the blowdown water storage tank 110a. The blowdown water storage tank 110a can, for example, serve as a buffer to handle fluctuations in flow in the system 100.

The ion exchange vessel 120 is in fluid communication with the blowdown water storage tank 110a. The blowdown water 101 flows from the blowdown water storage tank 110a to the ion exchange vessel 120. As mentioned previously, the blowdown water 101 may include chloride ions. In some implementations, a chloride quenching solution 102 is added to the blowdown water 101 to remove at least a portion of the chloride ions from the blowdown water 101. For example, the chloride quenching solution 102 reacts with chloride ions in the blowdown water 101, such that interference of the ion exchange in the ion exchange vessel 120 by such chloride ions is mitigated or eliminated, for example, by using chemicals (such as sodium sulfite or sodium bisulfite). In some implementations, the pH of the blowdown water 101 entering the ion exchange vessel 120 is monitored. The pH of the blowdown water 101 can be maintained, for example, in a range of from about 6.0 to about 10.0.

The ion exchange vessel 120 includes an ion exchange resin packing 122. The ion exchange resin packing 122 is configured to exchange ions with the blowdown water 101 and adsorb at least a portion of the phosphorus from the blowdown water 101 as the blowdown water 101 comes into contact with the ion exchange resin packing 122, which results in producing a water stream 121. The ion exchange resin packing 122 can include phosphorus-selective resin, such as polymeric ligand exchange resin or weak base anion exchange resin. An example reaction representing an ion exchange that can be performed by the ion exchange resin packing 122 is provided in Equation (1), in which chloride ions from the ion exchange resin packing 122 are exchanged for hydrogen phosphate ions from the blowdown water 101. Because at least a portion of the phosphorus from the blowdown water 101 has adsorbed to the ion exchange resin packing 122, the water stream 121 has a phosphorus content that is less than that of the blowdown water 101. In some implementations, the residence time of the blowdown water 101 within the ion exchange vessel 120 (for contacting the ion exchange resin packing 122) is at least about 5 minutes. In some implementations, the residence time of the blowdown water 101 within the ion exchange vessel 120 (for contacting the ion exchange resin packing 122) is at most about 15 minutes. In some implementations, the blowdown water 101 is flowed to the ion exchange resin packing 122 in the ion exchange vessel 120 at a loading rate in a range of from about 5 gallons per minute per square foot (gpm/ft$^2$) to about 15 gpm/ft$^2$. As blowdown water 101 continues to flow through the ion exchange vessel 120 and come into contact with the ion exchange resin packing 122, phosphorus accumulates on the ion exchange resin packing 122. When blowdown water 101 is flowing through the ion exchange vessel 120, the ion exchange vessel 120 can be considered to be in phosphorus adsorption mode. Eventually, phosphorus accumulates on the ion exchange resin packing 122 to a level at which the ion exchange resin packing 122 is considered saturated and should be regenerated (that is, the phosphorus that has accumulated on the ion exchange resin packing 122 is removed, such that the ion exchange resin packing 122 is regenerated and can be used again to adsorb phosphorus from the blowdown water 101). For example, the ion exchange resin packing 122 can be considered saturated when the water stream 121 exiting the ion exchange vessel 120 has a phosphorus content that is about 90% of the phosphorus content of the blowdown water 101 entering the ion exchange vessel 120.

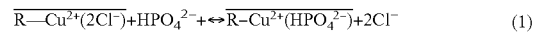

$$\overline{R-Cu^{2+}(2Cl^-)} + HPO_4^{2-} + \leftrightarrow \overline{R-Cu^{2+}(HPO_4^{2-})} + 2Cl^- \quad (1)$$

The water stream 121 can flow, for example, to a cooling water storage tank 110b. In some cases, the water stream 121 is circulated from the cooling water storage tank 110b back to the cooling tower as fresh make-up water to make up for the blowdown water 101. In some cases, the water stream 121 is further processed (for example, decontaminated and/or processed to remove additional dissolved solids) and then circulated back to the cooling tower as fresh make-up water to make up for the blowdown water 101.

In some cases, the ion exchange vessel 120 is switched to a solid removal mode before or after switching to the packing regeneration mode. The system 100 can include a first backwash storage tank 150a and a second backwash storage tank 150b. The first and second backwash storage tanks 150a, 150b can be in fluid communication with the ion exchange vessel 120. For example, a portion 121a of the water stream 121 can be flowed to the first backwash storage tank 150a and be stored in the first backwash storage tank 150a as backwash fluid 151a. While the ion exchange vessel 120 is in solid removal mode, the backwash fluid 151a can flow from the first backwash storage tank 150a to the ion exchange vessel 120. The backwash fluid 151a can, for example, cause the ion exchange resin packing 122 to swell and can cause at least a portion of solids that may have accumulated on the ion exchange resin packing 122 to be removed from the ion exchange resin packing 122. While the ion exchange vessel 120 is in solid removal mode, the backwash fluid 151b (including solids removed from the ion exchange resin packing 122 and/or the ion exchange vessel 120) can flow from the ion exchange vessel 120 to the second backwash storage tank 150b. The backwash fluid 151b can be stored in the second backwash storage tank 150b until the backwash fluid 151b is transported to be further processed (for example, decontamination) or to be disposed. While the ion exchange vessel 120 is in solid removal mode, the fluid communication between the ion exchange vessel 120 and the blowdown water storage tank 110a can be closed, such that fluid does not flow from the ion exchange vessel 120 to the blowdown water storage tank 110a and fluid does not flow from the blowdown water storage tank 110a to the ion exchange vessel 120.

Fresh regenerant 131a can be stored in the regenerant storage tank 130a. The fresh regenerant 131a includes sodium chloride. In some implementations, the fresh regenerant 131a is an aqueous solution of sodium chloride having a sodium chloride content in a range of from about 6 weight to volume percent (wt/v %) to about 15 wt/v %. Spent regenerant 131b can be stored in the spent regenerant storage tank 130b. The regenerant storage tank 130a and the spent regenerant storage tank 130b are fluid communication with the ion exchange vessel 120. While the ion exchange vessel 120 is in phosphorus adsorption mode, the fluid communication between the ion exchange vessel 120 and the regenerant storage tank 130a can be closed, such that fluid does not flow from the ion exchange vessel 120 to the regenerant storage tank 130a and fluid does not flow from the regenerant storage tank 130a to the ion exchange vessel 120. While the ion exchange vessel 120 is in phosphorus adsorption mode, the fluid communication between the ion exchange vessel 120 and the spent regenerant storage tank 130b can be closed, such that fluid does not flow from the ion exchange vessel 120 to the spent regenerant storage tank 130b and fluid does not flow from the spent regenerant storage tank 130b to the ion exchange vessel 120.

When the ion exchange resin packing 122 is considered saturated, the ion exchange vessel 120 can be switched to a packing regeneration mode. While the ion exchange vessel 120 is in packing regeneration mode, the fluid communication between the ion exchange vessel 120 and the regenerant storage tank 130a is open, and the fluid communication between the ion exchange vessel 120 and the spent regenerant storage tank 130b is open. While the ion exchange vessel 120 is in packing regeneration mode, the fluid communication between the ion exchange vessel 120 and the blowdown water storage tank 110a can be closed, such that fluid does not flow from the ion exchange vessel 120 to the blowdown water storage tank 110a and fluid does not flow from the blowdown water storage tank 110a to the ion exchange vessel 120. While the ion exchange vessel 120 is in packing regeneration mode, the fluid communication between the ion exchange vessel 120 and the first backwash storage tank 150a can be closed, such that fluid does not flow from the ion exchange vessel 120 to the first backwash storage tank 150a and fluid does not flow from the first backwash storage tank 150a to the ion exchange vessel 120. While the ion exchange vessel 120 is in packing regeneration mode, the fluid communication between the ion exchange vessel 120 and the second backwash storage tank 150b can be closed, such that fluid does not flow from the ion exchange vessel 120 to the second backwash storage tank 150b and fluid does not flow from the second backwash storage tank 150b to the ion exchange vessel 120.

While the ion exchange vessel 120 is in packing regeneration mode, fresh regenerant 131a flows from the regenerant storage tank 130a to the ion exchange vessel 120. The fresh regenerant 131a is used in a co-current regeneration approach to regenerate the ion exchange resin packing 122.

In some implementations, the fresh regenerant 131a is flowed to the ion exchange resin packing 122 in the ion exchange vessel 120 at a loading rate in a range of from about 2 gpm/ft$^2$ to about 6 gpm/ft$^2$. In some implementations, the pH of the fresh regenerant 131a entering the ion exchange vessel 120 is monitored. The pH of the fresh regenerant 131a can be maintained, for example, in a range of from about 4.0 to about 10.0. The regenerant 131a comes into contact with the phosphorus accumulated/adsorbed on the ion exchange resin packing 122 and desorbs at least a portion of the phosphorus from the ion exchange resin packing 122. In sum, the phosphorus is transferred from the ion exchange resin packing 122 to the fresh regenerant 131a to produce a spent regenerant 131b. In some implementations, the residence time of the fresh regenerant 131a within the ion exchange vessel 120 is in a range of from about 20 minutes to about 30 minutes (for example, about 25 minutes). An example reaction representing regeneration of the ion exchange resin packing 122 is provided in Equation (2), in which chloride ions from the fresh regenerant 131a are exchanged for hydrogen phosphate ions from the ion exchange resin packing 122. Fresh regenerant 131a can continue to flow to the ion exchange vessel 120 until a desired level of ion exchange resin packing 122 regeneration has been achieved. For example, the ion exchange resin packing 122 can be regenerated until at least about 90% of the phosphorus that was adsorbed to the ion exchange resin packing 122 has been desorbed from the ion exchange resin packing 122. The spent regenerant 131b (including the phosphorus that has desorbed from the ion exchange resin packing 122) flows from the ion exchange vessel 120 to the spent regenerant storage tank 130b.

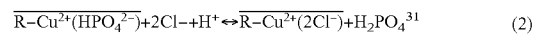

$$\overline{R-Cu^{2+}(HPO_4^{2-})}+2Cl-+H^+ \leftrightarrow \overline{R-Cu^{2+}(2Cl^-)}+H_2PO_4^{3+} \qquad (2)$$

The reaction vessel 140 is in fluid communication with the spent regenerant storage tank 130b. The spent regenerant 131b flows from the spent regenerant storage tank 130b to the reaction vessel 140. In some implementations, the pH of the spent regenerant 131b entering the ion exchange vessel 120 is monitored. The pH of the spent regenerant 131b can be maintained, for example, in a range of from about 4.0 to about 10.0. A first reactant stream 141 and a second reactant stream 142 flow to the reaction vessel 140. The first reactant stream 141 includes magnesium ions (for example, in the form of magnesium dichloride hexahydrate, MgCl$_2$·6H$_2$O). The second reactant stream 142 includes ammonium ions (for example, in the form of ammonium chloride, NH$_4$Cl). The first and second reactant streams 141, 142 can be provided to the reaction vessel 140 in a specified stoichiometric ratio. For example, a molar ratio of the magnesium ions in the first reactant stream 141 to the ammonium ions in the second reactant stream 142 can be about 1:1. The spent regenerant 131b, the first reactant stream 141, and the second reactant stream 142 are mixed in the reaction vessel 140 to produce a product 145a. Rapid mixing, flocculation, and sedimentation of the spent regenerant 131b, the first reactant stream 141, and the second reactant stream 142 occur in the reaction vessel 140 to produce the product 145a. A bench-scale jar test can be conducted, for example, to determine optimal mixing conditions in the reaction vessel 140 for producing the product 145a. The pH of the fluids within the reaction vessel 140 can be maintained, for example, in a range of from about 9.0 to about 10.0. In some implementations, the spent regenerant 131b, the first reactant stream 141, and the second reactant stream 142 are mixed and retained within the reaction vessel 140 for at least 60 minutes. The product 145a includes struvite (MgNH$_4$PO$_4$·6H$_2$O). An example reaction representing the generation of struvite in the reaction vessel 140 in response to mixing the spent regenerant 131*b*, the first reactant stream 141, and the second reactant stream 142 is provided in Equation (3). The reaction vessel 140 can include, for example a mechanical mixer that includes rotating blades that can be used to mix the spent regenerant 131*b*, the first reactant stream 141, and the second reactant stream 142 within the reaction vessel 140.

$$Mg^{2+}+NH_4^++PO_4^{3-}+6H_2O \leftrightarrow MgNH_4PO_4\cdot 6H_2O \qquad (3)$$

The system 100 can include a filter 160. The filter 160 can be in fluid communication with the reaction vessel 140. A remaining supernatant fluid 147*a* (apart from the product 145*a*) can flow from the reaction vessel 140 to the filter 160. The filter 160 can filter the supernatant fluid 147*a* to remove at least a portion of solids to produce a filtered supernatant stream 147*b*. The filter 160 can include, for example, a sieve with an average hole diameter of about 5 micrometers. In some cases, the filter 160 is in fluid communication with the blowdown water storage tank 110, and the filtered supernatant stream 147*b* can be flowed to the blowdown water storage tank 110, such that the filtered supernatant stream 147*b* can be recycled back to the ion exchange vessel 120 for further phosphorus removal.

The system 100 can include a dryer 170 downstream of the reaction vessel 140. The dryer 170 can receive the product 145*a* from the reaction vessel 140 and dry the product 145*a*. The dryer 170 can include, for example, a heater (such as an electric heater or a heat exchanger), a drying bed, a filter press, or any combination of these. The dryer 170 dries the product 145*a* to produce a dried struvite product 145*b*. In some implementations, the dried struvite product 145*b* has a moisture content that is greater than zero and less than 25 wt. %.

Figure 2:
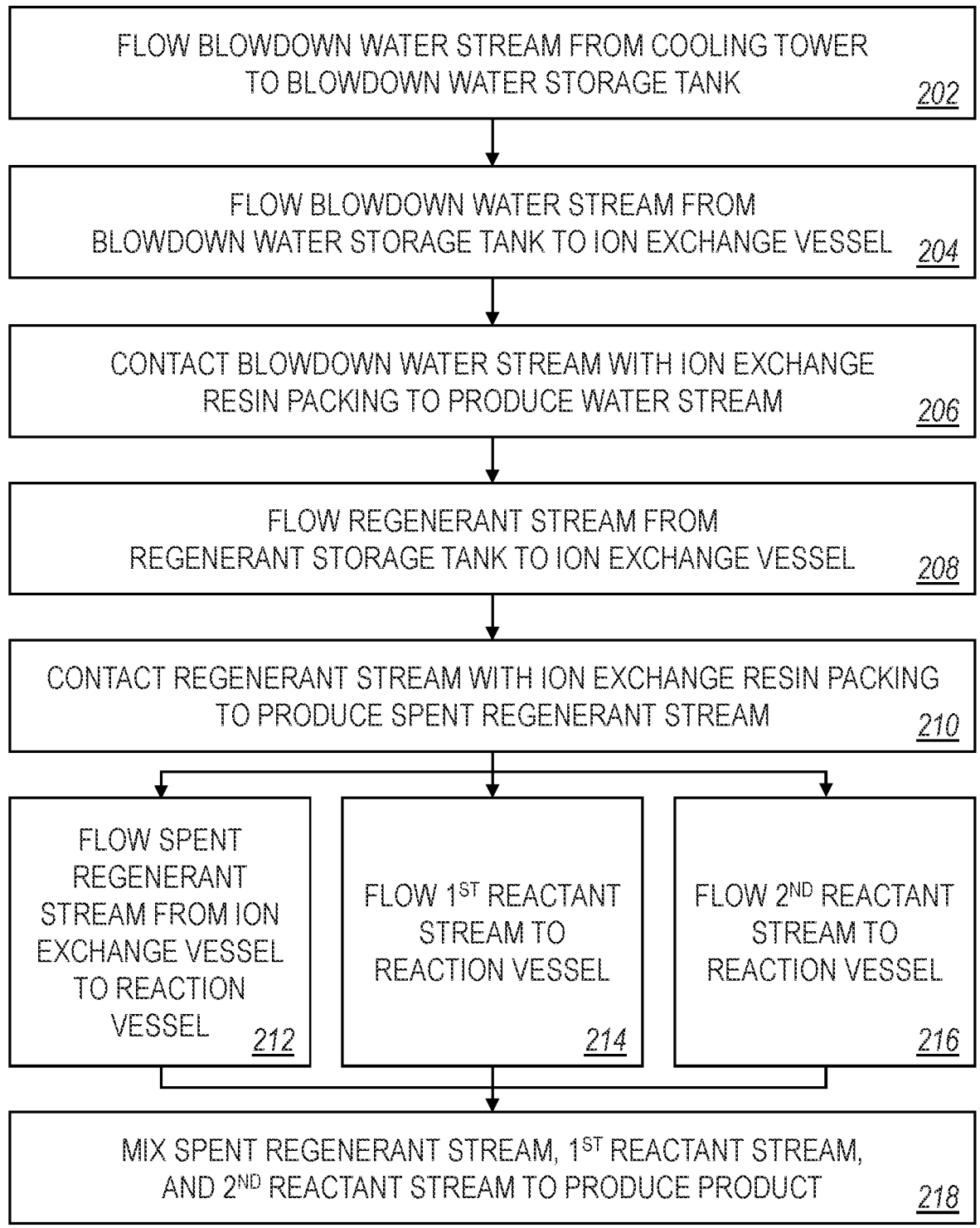
FIG. 2 is a flow chart of an example method for processing cooling tower blowdown water to produce fertilizer.

FIG. 2 is a flow chart of an example method 200 for processing cooling tower blowdown water to produce fertilizer. The method 200 can be implemented, for example, by the system 100. At block 202, a blowdown water stream (such as the blowdown water stream 101) is flowed from a cooling tower to a blowdown water storage tank (such as the blowdown water storage tank 110). As mentioned previously, the blowdown water stream 101 includes phosphorus. At block 204, the blowdown water stream 101 is flowed from the blowdown water storage tank 110 to an ion exchange vessel (such as the ion exchange vessel 120). As mentioned previously, the ion exchange vessel 120 includes an ion exchange resin packing 122. At block 206, the blowdown water stream 101 is contacted with the ion exchange resin packing 122, such that at least a portion of the phosphorus from the blowdown water stream 101 adsorbs to the ion exchange resin packing 122 to produce a water stream 121. The water stream 121 therefore has a phosphorus content that is less than the phosphorus content of the blowdown water stream 101. In some implementations, a chloride quenching solution (such as the chloride quenching solution 102) is added to the blowdown water stream 101 prior to contacting the blowdown water stream 101 with the ion exchange resin packing 122 at block 206.

At block 208, a regenerant (such as the fresh regenerant 131*a*) is flowed from a regenerant storage tank (such as the regenerant storage tank 130*a*) to the ion exchange vessel. As mentioned previously, the fresh regenerant 131*a* includes sodium chloride. At block 210, the fresh regenerant 131*a* is contacted with the ion exchange resin packing 122 (and the phosphorus adsorbed to the ion exchange resin packing 122), such that at least a portion of the phosphorus (that has adsorbed to the ion exchange resin packing 122 due to block 206) desorbs from the ion exchange resin packing 122 to produce a spent regenerant stream (such as the spent regenerant stream 131*b*).

At block 212, the spent regenerant stream 131*b* is flowed from the ion exchange vessel 120 to a reaction vessel (such as the reaction vessel 140). At block 214, a first reactant stream (such as the first reactant stream 141) is flowed to the reaction vessel 140. As mentioned previously, the first reactant stream 141 includes magnesium ions. At block 216, a second reactant stream (such as the second reactant stream 143) is flowed to the reaction vessel 140. As mentioned previously, the second reactant stream 143 includes ammonium ions. At block 218, the spent regenerant stream 131*b*, the first reactant stream 141, and the second reactant stream 143 are mixed to produce a product (such as the product 145*a*). As mentioned previously, the product 145*a* includes struvite. In some implementations, the product 145*a* is flowed to a dryer (such as the dryer 170), and the product 145*a* is dried by the dryer 170 to produce a dried struvite product (such as the dried struvite product 145*b*).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
   a blowdown water storage tank in fluid communication with a cooling tower, the blowdown water storage tank configured to receive blowdown water from the cooling tower, wherein the blowdown water comprises phosphorus;
   an ion exchange vessel in fluid communication with the blowdown water storage tank, the ion exchange vessel configured to receive the blowdown water from the blowdown water storage tank, the ion exchange vessel comprising an ion exchange resin packing configured to adsorb at least a portion of the phosphorus from the blowdown water as the blowdown water comes into contact with the ion exchange resin packing to produce a water stream having a phosphorus content that is less than a phosphorus content of the blowdown water;
   a regenerant storage tank in fluid communication with the ion exchange vessel, the regenerant storage tank storing a regenerant comprising sodium chloride, wherein the ion exchange vessel is configured to receive the regenerant from the regenerant storage tank, and the regenerant is configured to desorb at a least a portion of the phosphorus that has adsorbed to the ion exchange resin packing, from the ion exchange resin packing as the regenerant comes into contact with the ion exchange resin packing to produce a spent regenerant stream;
   a spent regenerant storage tank in fluid communication with the ion exchange vessel, the spent regenerant storage tank configured to receive the spent regenerant stream from the ion exchange vessel;
   a reaction vessel in fluid communication with the spent regenerant storage tank, the reaction vessel configured to receive the spent regenerant stream from the spent regenerant storage tank, a first reactant stream comprising magnesium ions, and a second reactant stream comprising ammonium ions, the reaction vessel configured to mix the spent regenerant stream, the first reactant stream, and the second reactant stream to produce a product comprising struvite;
   a first backwash storage tank in fluid communication with the ion exchange vessel, the first backwash storage tank configured to receive at least a portion of the water stream from the ion exchange vessel, wherein the portion of the water stream is circulated back to the ion exchange vessel to remove at least a portion of solids from the ion exchange resin packing to produce a backwash stream; and
   a second backwash storage tank in fluid communication with the ion exchange vessel, the second backwash storage tank configured to receive the backwash stream from the ion exchange vessel and store the backwash stream for subsequent processing or disposal.

2. The system of claim 1, wherein the reaction vessel comprises a mixer configured to mix the spent regenerant stream, the first reactant stream, and the second reactant stream to promote interaction amongst the spent regenerant stream, the first reaction stream, and the second reactant stream, resulting in producing the product.

3. The system of claim 2, comprising a filter in fluid communication with the reaction vessel, wherein the filter is configured to receive a remaining supernatant fluid, apart from the product, from the reaction vessel and filter the remaining supernatant fluid to remove at least a portion of solids to produce a filtered supernatant stream.

4. The system of claim 3, wherein the blowdown storage tank is configured to receive the filtered supernatant stream, such that the filtered supernatant stream is recycled back to the ion exchange vessel for further phosphorus removal.

5. The system of claim 4, comprising a dryer downstream of the reaction vessel, the dryer configured to receive the product from the reaction vessel, the dryer configured to dry the product to produce a dried struvite product having a moisture content that is non-zero and less than 25 weight percent (wt. %).

6. The system of claim 5, wherein the regenerant has a sodium chloride content in a range of from about 6 weight to volume percent (wt/v %) to about 15 wt/v %.

7. The system of claim 6, wherein a molar ratio of the magnesium ions in the first reactant stream to the ammonium ions in the second reactant stream is about 1:1.

8. A method comprising:
   flowing a blowdown water stream from a cooling tower to a blowdown water storage tank, the blowdown water comprising phosphorus;
   flowing the blowdown water stream from the blowdown water storage tank to an ion exchange vessel, the ion exchange vessel comprising an ion exchange resin packing;
   contacting the blowdown water stream with the ion exchange resin packing, such that at least a portion of the phosphorus from the blowdown water stream adsorbs to the ion exchange resin packing to produce a water stream having a phosphorus content that is less than a phosphorus content of the blowdown water stream;
   flowing a regenerant stream from a regenerant storage tank to the ion exchange vessel, the regenerant stream comprising sodium chloride;
   contacting the regenerant stream with the ion exchange resin packing, such that at least a portion of the phosphorus that has adsorbed to the ion exchange resin packing, desorbs from the ion exchange resin packing to produce a spent regenerant stream;

flowing the spent regenerant stream from the ion exchange vessel to a reaction vessel;

flowing a first reactant stream to the reaction vessel, the first reactant stream comprising magnesium ions;

flowing a second reactant stream to the reaction vessel, the second reactant stream comprising ammonium ions;

mixing the spent regenerant stream, the first reactant stream, and the second reactant stream in the reaction vessel to produce a product comprising struvite;

flowing at least a portion of the water stream from the ion exchange vessel to a first backwash storage tank;

circulating at least the portion of the water stream back from the first backwash storage tank to the ion exchange vessel to remove at least a portion of solids from the ion exchange resin packing to produce a backwash stream;

flowing the backwash stream from the ion exchange vessel to a second backwash storage tank; and storing the backwash stream in the second backwash storage tank for subsequent processing or disposal.

9. The method of claim 8, wherein the blowdown water stream comprises chloride, and the method comprises, prior to contacting the blowdown water stream with the ion exchange resin packing, adding a chloride quenching solution to the blowdown water stream, such that at least a portion of the chloride in the blowdown water stream is removed.

10. The method of claim 9, comprising:

flowing a remaining supernatant fluid, apart from the product, from the reaction vessel to a filter; and removing, by the filter, at least a portion of solids from the remaining supernatant fluid to produce a filtered supernatant stream.

11. The method of claim 10, comprising:

flowing the filtered supernatant stream from the filter to the blowdown storage tank; and recycling the filtered supernatant stream to the ion exchange vessel for further phosphorus removal.

12. The method of claim 11, comprising:

flowing the product from the reaction vessel to a dryer; and drying, by the dryer, the product to produce a dried struvite product having a moisture content that is non-zero and less than 25 weight percent (wt. %).

13. The method of claim 12, wherein the regenerant stream has a sodium chloride content in a range of from about 6 weight to volume percent (wt/v %) to about 15 wt/v %.

14. The method of claim 13, wherein a molar ratio of the magnesium ions in the first reactant stream to the ammonium ions in the second reactant stream is about 1:1.

* * * * *